United States Patent [19]

Turner

[11] Patent Number: 4,814,035

[45] Date of Patent: Mar. 21, 1989

[54] METHOD OF MAKING UNDERWATER MARKER

[75] Inventor: Donald M. Turner, Bath, England

[73] Assignee: Avon Rubber p/c, Wiltshire, Great Britain

[21] Appl. No.: 43,309

[22] Filed: Apr. 28, 1987

[30] Foreign Application Priority Data

Apr. 28, 1986 [GB] United Kingdom ................. 8610331

[51] Int. Cl.[4] .......................... B44G 1/16; B32B 31/00

[52] U.S. Cl. ..................................... 156/235; 156/230; 156/293; 156/298; 428/907

[58] Field of Search ............... 156/153, 154, 230, 235, 156/238, 239, 240, 241, 247, 249, 293, 298, 303.1, 300, 268, 257, 63, 307.7; 428/907, 63, 67

[56] References Cited

U.S. PATENT DOCUMENTS

| | | | |
|---|---|---|---|
| 2,340,392 | 2/1944 | Lefcourt | 156/293 |
| 3,438,838 | 4/1969 | Pellicer et al. | 156/293 |
| 3,879,876 | 4/1975 | Morgan | 156/153 |
| 4,263,734 | 4/1981 | Bradshaw | 156/293 |
| 4,753,701 | 6/1988 | Turner | 156/247 |

FOREIGN PATENT DOCUMENTS

| | | | |
|---|---|---|---|
| 0196207 | 10/1986 | European Pat. Off. | 156/230 |
| 2126959 | 4/1984 | United Kingdom . | |

*Primary Examiner*—Michael W. Ball
*Assistant Examiner*—Louis Falasco
*Attorney, Agent, or Firm*—Kenyon & Kenyon

[57] ABSTRACT

To make an underwater marker with indicia on it, an uncured or partcured base material of one color is prepared with the shape of the desired indicia cut out of it. The indicia are cut from uncured or partcured material of different color and are fitted into the cut-out in the base material to form a single layer. A transfer material bearing antifouling material is placed over the face of the layer and the assembly is pressed together to embed the antifouling material into the layer and to cure the contrasting materials together with each other and with an optionally underlying reinforcing layer. A backing sheet of the transfer material is stripped off to expose the particles.

5 Claims, 2 Drawing Sheets

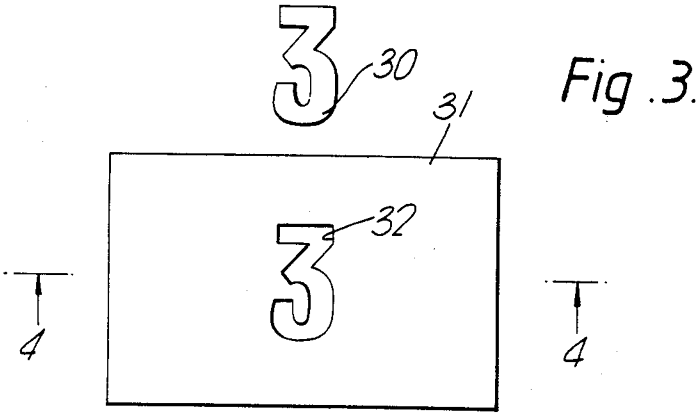
Fig.3.
Fig.4.
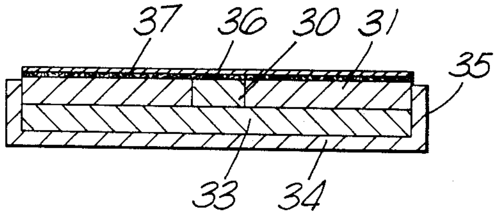
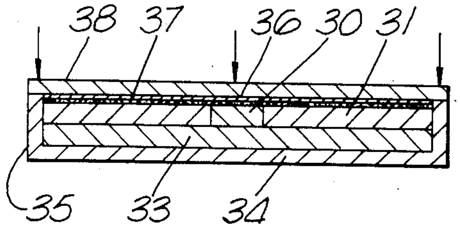
Fig.5.
Fig.6.
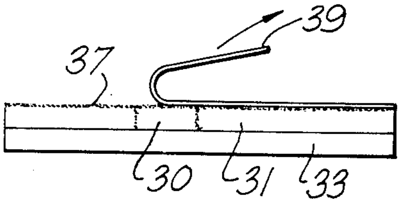
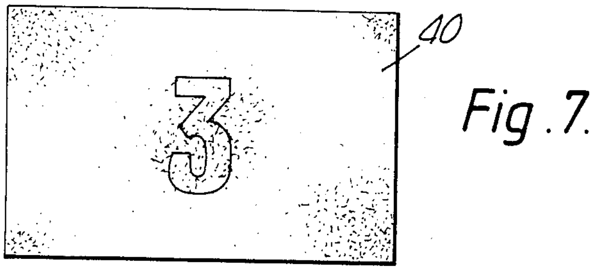
Fig.7.

METHOD OF MAKING UNDERWATER MARKER

The marking of structures underwater is a problem. Ordinary painted or embossed signs will very soon be corroded away or hidden by growth. The making of markers with an antifouling surface however presents difficulties in the preservation at the same time of the antifouling properties and of contrast in the surface by which symbols can be recognised.

The present invention is concerned with a particularly attractive and economical solution of this problem.

In this invention an underwater marker is made with an antifouling surface by using part-cured or uncured sheets of elastomer of contrasting colours, by making a positive shape of a desired symbol from a sheet of one colour, making a negative outline of the same symbol from a sheet of a colour contrasting with the one colour, the positive and negative outlines being closely conforming.

fitting the positive into the negative outline to form a single-thickness sheet, placing on the surface of the single-thickness sheet which is exposed and which shows the contrasting symbol a transfer material bearing antifouling particles, with the particles contacting that surface, moulding the layers together to embed the particles in the said surface and to cure together the sheets the particles and a reinforcing backing sheet, if provided, and stripping off a backing web of the transfer material to leave exposed a cured surface of a reinforced marker laminate in which the desired symbol is visible and over the area of which the antifouling particles are distributed.

The method may include assembling the single-thickness sheet on a part cured or uncured reinforcing sheet (the fitting together of the two contrasting sheets may be done at the same time as or later than the assembly with the reinforcing sheet).

The moulding is preferably done within a moulding frame to the dimensions of which both the elastomer and reinforcing sheets are carefully cut, whereby moulding pressure is prevented from causing any substantial sideways escape of the laminate or of its elements.

If the moulding is carried out under controlled conditions of temperature and pressure, readily found by empirical trial, it will be found that an effectively jointless uniform sheet is formed by the curing together of the materials of contrasting colours but without any substantial running or blurring at the interface between them, that the particles are firmly embedded, that a firm lamination is achieved and that there is no run off at the edges.

In particular it is desirable to carry out the moulding in a moulding frame which constrains the edges of the sheets as mentioned and of which an uppermost surface is of the order of 0.5 mm lower than the exposed surface of the sheets of contrasting colours.

The transfer material may be that claimed in and made by the method of copending European application No. 86302149 now European patent publication No. 0196207, published Oct. 1, 1986, equivalent to U.S. application No. 843,739 (Turner) filed on 25 Mar. 1986 now U.S. Pat. No. 4,753,701, issued June 28, 1988.

In the accompanying drawings, FIGS. 1 and 2 are side views, FIG. 2 being on a larger scale, of apparatus according to the said applications for making transfer material.

FIG. 3 shows the positive and negative outlines of a symbol made from sheets of elastomer of different colours;

FIG. 4 shows the two sheets assembled together with a reinforcing sheet and a transfer sheet in a pressing mould;

FIG. 5 shows the assembly with a press plate applied to it;

FIG. 6 shows a cured completed product with a backing web of the transfer material being stripped away;

FIG. 7 is a diagrammatic face view of the finished marker.

Figure 1:
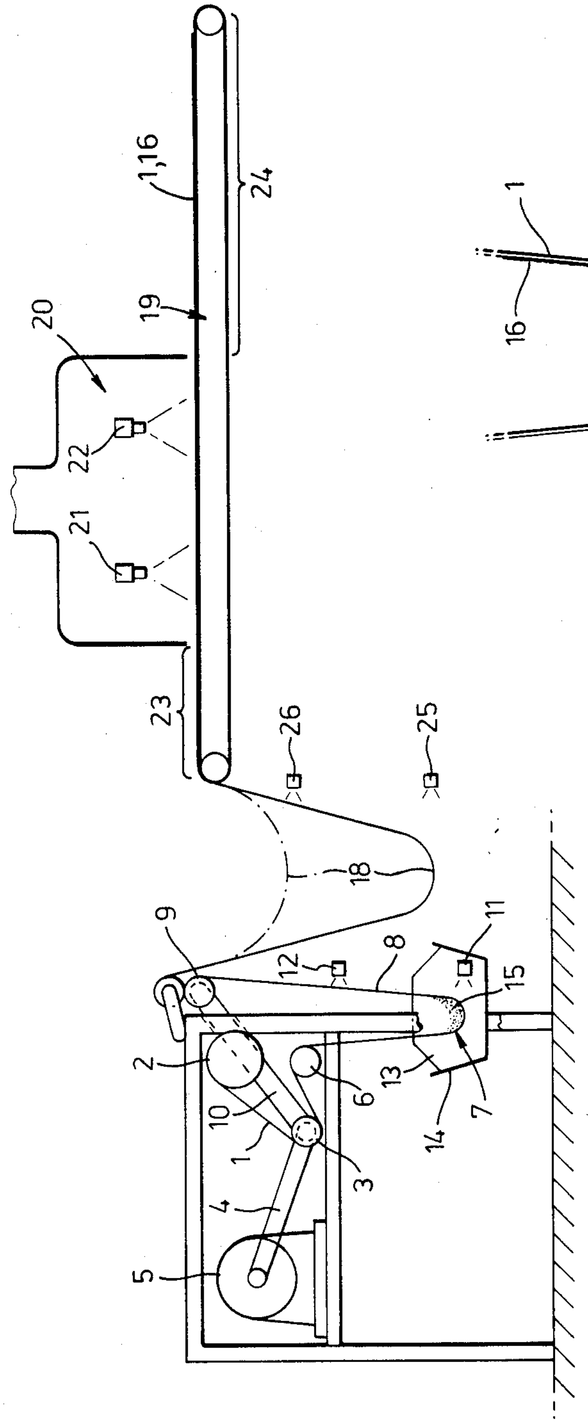
Figure 2:
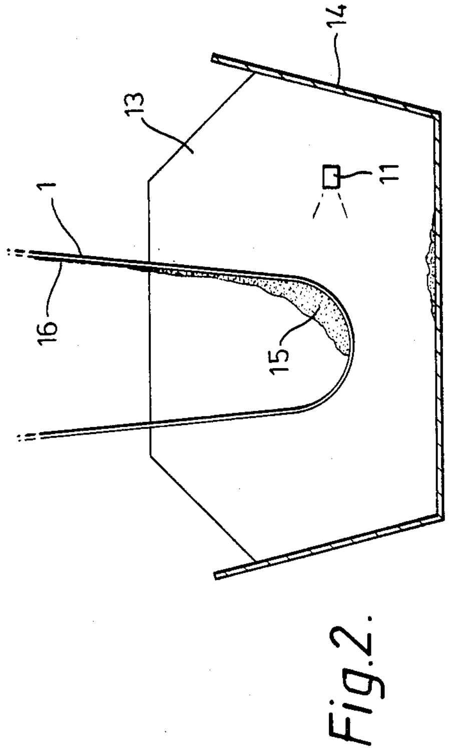

We describe first how to make a transfer material which may be the material applied in the present invention:

FIGS. 1 and 2 of the drawings illustrate apparatus for the application of cupro nickel granules to adhesive tape. The apparatus should be capable of applying granules to adhesive strip or sheet of widths between about 0.3 and 1 m.

A backing web 1 of material with an adhesive surface 1 is pulled off a roll 2 of tape by means of a knurled roller 3 driven through a belt 4 by an electric motor 5. A suitable web is available from Adhesive Tapes and Conversions Limited, Crowborough, Sussex, England, under the name PPI 1022. The web passes over an idler roller 6 downwardly into a dip 7 before rising at 8 to a roller 9 which is driven by belt 10 from the motor 5 via belt 4. Photo electric sensors 11,12 detect if the base of the dip reaches a level below sensor 11 or above sensor 12, and stop the drive if it does. End plates 13 are similar to the guides on a mill roll and can be set to accommodate the width of the web with a minimum or zero gap between the edges of the web and themselves. A trough 14 is below the dip. A bank of granules 15 such as the chopped copper or copper wire as described above is placed on the adhesive web 1 in the dip 7 and is held on it by the end plates 13. It has been found that, when the strip is pulled through by the roller 9, the weight of the granules is sufficient to preserve the dip 7 and the granules roll, providing excellent coverage of the tape by an adhered layer 16 of granules. Granules which are not adhering to the tape will roll back down the incline 8. The only escape for the granules is that some will fall over the edges and these are caught in the tray 14. These can be led back to the bank 15. Guide surfaces (not shown) may be provided especially behind the rise run 8 to help form the dip and prevent bulging or swinging.

The web with granules on its surface passes between the driven roller 9 and a pressure roller 17 to consolidate the adhered layer 16 and then a variable loop 18 to a main conveyor 19 which includes a spraying zone 20. There need to be sufficient spraying guns to ensure coverage of the complete width of the strip. The number of spray guns can be activated according to the required width and spray beyond the edges of the web can be blanked off.

The first row 21 of spray guns would be spraying a primer such as Chemlok Primer 205 and the second row 22 an adhesive such as Chemlok Adhesive CH47. Extraction and hot air driers are provided and, if necessary, infra-red heating.

At the moment, anti-fouling material is required in lengths of about 4 m. In this case the total length of the run of the main conveyor 19 should be 1 m. in the region 23 before the spraying zone, 2 m. in the spray zone 20 and 5 m. in the region 24. This will provide room for material to be cut to length and removed sideways from the conveyor 19. This main conveyor 5 (as also the web drives) can be hand driven but preferably will be powered.

It is moved intermittently to allow further actions (to be described) or cutting and removal to occur in the region 24. Since the web 1 is in principle being moved continuously, the loop 18 varies in its extent between the limits shown. Photo electric sensors 25,26 detect these limits and may indeed control the drive of the conveyor 19 in a repetitive run.

To make an underwater marker a positive image 30 is made of a desired symbol, here the Arabic numeral 3. This is made from a sheet of uncured elastomer material of one colour for example yellow.

Another sheet of the same or a compatible uncured or part-cured material is meanwhile prepared as seen at 31 with a negative image 32 cut from it in the appropriate place, which of course need not be central in the manner as shown here, but could be anywhere on the sheet. Furthermore, more than one symbol may be let into the sheet 31 and these may be of the same or respectively different colours contrasting with the colour of the sheet 31.

The outer dimensions of the sheet 31 are known. The positive and negative images of the symbol are made very precisely to conform exactly to each other.

In a next step the two sheets are assembled together and with an uncured or partly cured reinforcing layer 33 in a mould frame 34. It is clear that the positive image 30 of the symbol may be inserted into the sheet 31 before they are placed together upon the pre-placed reinforcing layer 33 or the two layers may be assembled together before being placed in the mould or (as is probably most convenient) the reinforcing layer 33 may be placed first in the mould followed by the layer 31 and the positive image 30 of the symbol being placed in last. In whichever order the steps are carried out, the assembly of 30 and 31 results in a sheet of single thickness—that of the sheet 31.

The moulding frame 34 may have a base and walls 35 as shown or may simply be an open-bottomed frame with walls 35 only. It is dimensioned to fit exactly the outer dimensions of the sheet 31 and the reinforcing layer is cut equally to fit.

The nature of the reinforcement in the layer 33 may be conventional cord layers or the like and its matrix is part cured or uncured and is compatible with the materials used in sheets 30 and 31.

Transfer material to be taken from or still at the region 24 is now cut to the same size to form sheet 36. It is placed on the exposed face of the sheets 30,31 with the metal particles 37 in contact with that face.

Then as seen in FIG. 5 a heated press mould plate 38 is applied to at least one face of the laminate to press together the sheets 30,31 and 33 and 36, to cure them together i.e. to cure together both the sheets 30 and 31 around the boundaries of the symbol and to cure both of those sheets together with the reinforcing layer 33.

At the same time the particles 37 are forced into and embedded in the exposed surface of the sheets 30,31 over the whole of that surface and are cured into it.

The conditions of pressure and temperature are to be regulated in such a way as not to cause undue distortion of the sheets which would cause distortion of the symbol and perhaps a spread or flow of the material at its edge leading to some indistinctness or confusibility. Furthermore the complete laminate should be contained within the walls 35 of the frame so that there is no opportunity for heated material to escape and flow from the edges of the laminate since this would cause decrease of the particle density in that area and thus possible encroachment of marine growth upon the marker when it is in use.

A particularly useful rule of thumb method of limiting the pressure applied is to construct the mould frame in such a way that the walls 35 are 0.5 mm less high than the uncured assembly including the thickness of the uncured elastomer sheets plus reinforcing sheet, see FIG. 4.

Then as best seen in FIG. 6 the backing web 39 of the transfer material 36 is stripped off leaving the metal particles embedded in a substantially uniform but random distribution over the whole of the face of the finished article 40. If necessary, the particles may be polished or buffed in that surface.

I claim:

1. A method of making underwater marker of elastomeric material including the steps of forming a hole as a negative image of an indicia in an at least partly uncured sheet of elastomer of one colour, forming a positive image of the same indicia in an at least partly uncured sheet of elastomer of a colour different from the one colour, placing the positive image in the hole to form a single layer, said single layer having two faces each of which shows at least two colours of material, superposing a transfer material on one of said faces of said single layer, the transfer material having a backing sheet with two faces, there being antifouling particles on one of said faces thereof, the said one face of the transfer material being placed next to the said one face of the said single layer, pressing the transfer material and single layer together with heating to embed the antifouling particles in the said one face of the single layer and to at least substantially cure the elastomer material of the colour-contrasted layer.

2. A method as claimed in claim 1, wherein before pressing and heating the single layer is superposed on a reinforcing layer of at least partly uncured elastomer material, whereby the pressing and heating additionally cures together the single layer and the reinforcing layer.

3. A method as claimed in claim 1 including the additional step of removing the backing sheet of the transfer material and abrading the said one face of the single layer whereby to ensure exposure of said particles at said face.

4. A method as claimed in claim 2 including the additional step of removing the backing sheet of the transfer material and abrading the said one face of the single layer whereby to ensure exposure of said particles at said face.

5. A method as claimed in claim 1 including, in any order, superposing the transfer material on the said one face of the single layer and superposing the single layer on a layer of reinforcement material and placing at least the reinforcement material and the single layer in a mould coextensive with the single layer, and thereafter applying a press to the transfer material and layers while in the mould, limiting the distance of travel of the press while thus applied to about 0.5 mm.

* * * * *

UNITED STATES PATENT AND TRADEMARK OFFICE

CERTIFICATE OF CORRECTION

PATENT NO. : 4,814,035

DATED : March 21, 1989

INVENTOR(S) : Donald M. Turner

It is certified that error appears in the above-identified patent and that said Letters Patent is hereby corrected as shown below:

Column 1, line 63, delete "86302149" and insert --86302149.9--; and

Column 4, line 22, delete "underwater" and insert --an underwater--.

Signed and Sealed this

Fourteenth Day of November, 1989

*Attest:*

JEFFREY M. SAMUELS

*Attesting Officer*

*Acting Commissioner of Patents and Trademarks*